US00RE33966E

United States Patent [19]

Robison

[11] E Patent Number: Re. 33,966

[45] Reissued Date of Patent: Jun. 23, 1992

[54] ALL WEATHER GARMENT

[75] Inventor: Maurice L. Robison, Idaho Falls, Id.

[73] Assignee: Marco Distributing, Inc., Idaho Falls, Id.

[21] Appl. No.: 724,873

[22] Filed: Jul. 2, 1991

Related U.S. Patent Documents

Reissue of:

[64] Patent No.: 4,993,077
Issued: Feb. 19, 1991
Appl. No.: 490,352
Filed: Mar. 8, 1990

[51] Int. Cl.[5] ..... A41D 13/02

[52] U.S. Cl. ..... 2/82; 2/79; 2/227

[58] Field of Search ..... 2/2, 2.5, 51, 69, 79, 2/82, 97, 227, 228, 229, 230, 231, 232, 233, 234, 235, 236, 237, 272, DIG. 5

[56] References Cited

U.S. PATENT DOCUMENTS

| | | | |
|---|---|---|---|
| 2,138,588 | 11/1938 | Wann | 2/227 |
| 2,522,421 | 9/1950 | Wolf | 2/80 |
| 3,180,336 | 4/1965 | Beit | 128/288 |
| 4,034,417 | 7/1977 | Ellis | 2/227 |
| 4,069,513 | 1/1978 | Shiller | 2/227 |
| 4,272,851 | 6/1981 | Goldstein | 2/82 |
| 4,276,341 | 6/1981 | Tanaka | 2/82 |
| 4,483,019 | 11/1984 | Spangrud | 2/82 |
| 4,547,904 | 10/1985 | Long | 2/2.1 R |
| 4,667,344 | 5/1987 | Cooper | 2/82 |
| 4,683,593 | 8/1987 | Langley | 2/82 |
| 4,907,295 | 3/1990 | Yasuda | 2/82 |
| 4,912,860 | 4/1990 | Keller | 2/227 |
| 4,920,575 | 5/1990 | Bartasis | 2/2 |

FOREIGN PATENT DOCUMENTS

| | | | |
|---|---|---|---|
| 1056553 | 6/1979 | Canada | 2/82 |
| 1117065 | 11/1961 | Fed. Rep. of Germany | 2/82 |
| 2543046 | 4/1977 | Fed. Rep. of Germany | 2/79 |
| 2458238 | 2/1981 | France | 2/82 |
| 10677 | of 1913 | United Kingdom | 2/79 |
| 1583447 | 1/1981 | United Kingdom | 2/79 |

*Primary Examiner*—Werner H. Schroeder
*Assistant Examiner*—D. Biefeld
*Attorney, Agent, or Firm*—Bachman & Lapointe

[57] ABSTRACT

An insulated all weather garment in male and female configuration is disclosed which includes an internal waterproof layer having sealed [stitching] *seams*, protecting the upper legs and lower torso of a wearer from moisture penetrating from the outdoor atmosphere.

17 Claims, 5 Drawing Sheets

ALL WEATHER GARMENT

Matter enclosed in heavy brackets [ ] appears in the original patent but forms no part of this reissue specification; matter printed in italics indicates the additions made by reissue.

BACKGROUND OF THE INVENTION

The present invention relates to outdoor garments and relates in particular to sporting garments useful in winter weather.

The invention is especially useful during the operation of snowmobiles, all terrain vehicles, trail bikes and the like, including activities such as cross-country and downhill skiing, ice fishing, ice boating, snowshoeing and similar activities of the type which are conducted in snowy or wet winter weather.

It is a special feature of the present invention to provide a multi-layered insulated body garment which includes an interior protective shield which is positioned within the garment in the region of the wearers torso or trunk.

The prior art is replete with insulated outdoor garments which include body and leg covers.

While these prior art garments provide protection from the cold, they fail to provide protection from moisture seeping through the garment at sewn seams, particularly in the seat area.

For example, in the operation of a snowmobile, the operator assumes a sitting position interrupted frequently by the requirement to stand in the machine to observe terrain, or to look for potential obstructions ahead.

During this occurrence, the seat of the snowmobile and/or the seat of the operator often become encrusted or splashed with snow, wet snow, slush, water or ice.

Unfortunately, moisture penetrates the needle holes of the garment's sewn seams as body heat, heat generated by the snowmobile engine or atmospheric conditions melt the frosty crust.

This occurrence results in a very uncomfortable body sensation as the water seepage reaches the skin.

Experience in testing textile fabrics having a waterproof coating has shown that such coatings wear away readily exposing the wearer's body to moisture, penetrating the fabric from external sources.

Thus, the present invention keeps the "bottom" dry by inserting a waterproof "diaper" between inner and outer shells of the garment.

SUMMARY OF THE INVENTION

Consequently, it is a primary purpose of the present invention to provide an all weather insulated garment which includes a special interest barrier or layer which is impervious to water.

A still further feature of the invention is the provision of a waterproof barrier layer between inner and outer shells of a garment where the barrier layer is not subject to wear and abrasion of the type that would destroy or diminish the waterproof character of the barrier layer.

A multi-layer, all weather garment which provides protection from the elements, in particular water, may comprise contiguous leg and torso sections, said leg and torso sections having inner and outer shells defining first and second layers, said first layer comprising an inner, textile fabric bound compositely to an insulating, textile batting, said second layer comprising an outer waterproof textile fabric, a third layer of waterproof textile fabric sandwiched between said first and second layers, said third layer comprising a plurality of panels secured together to define a continuous, heat sealed inseam joining heat sealed front and back seams, all said seams being free of sewn stitching, the panels of said third layer being disposed and dimensioned relative to said first and second layers so as to overlay and conform to a portion of said leg sections extending continuously to a portion of said torso section to encompass a wearer's seat, and a fourth layer at the extremities of said leg sections, secured to said inner textile fabric of said first layer defining ankle cuffs.

Other features and advantages of the present invention will become more apparent from an examination of the succeeding specification when read in conjunction with the appended drawings, in which:

DETAILED DESCRIPTION OF THE INVENTION

Figure 1:
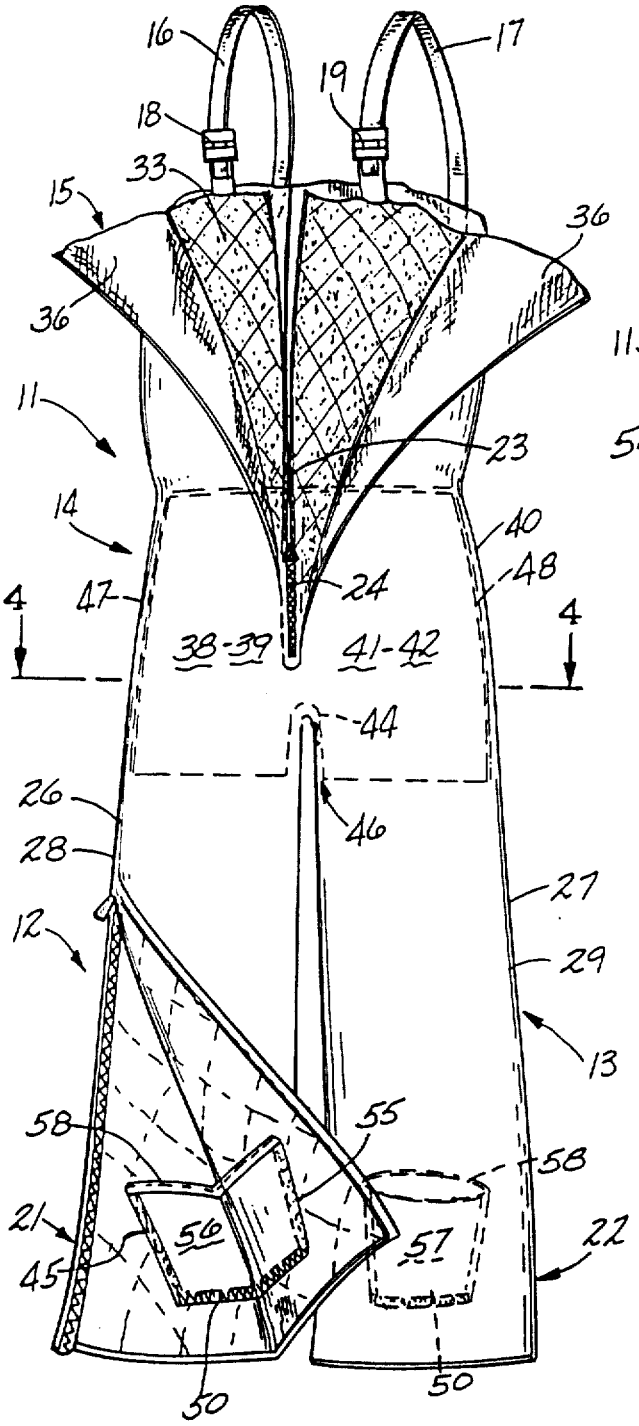
FIG. 1 is a front elevational view of the garment with portions thereof broken away for clarity.

Referring to FIGS. 1, 1A, 2 and 3, the reference numeral 11 designates an all weather garment having leg sections 12 and 13, torso section 14, bib section 15, detachable support straps 16 and 17, strap adjustments 18 and 19, ankle cuffs 21 and 22, front slit or opening 23, slit closure means 24, side slit 26 and 27 with closure means 28 and 29.

As will be more apparent as this specification proceeds, the garment of the present invention contemplates a male wearer configuration and a female wearer configuration.

Figure 2:
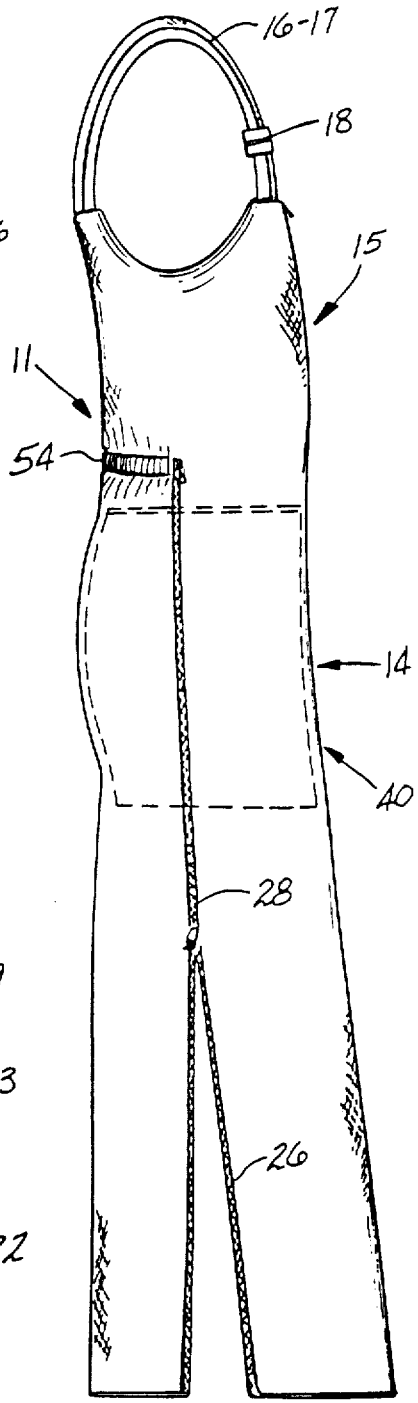
FIG. 2 is a side elevational view of the left side of FIG. 1 showing a male configuration.

In the male configuration, the support straps 16 and 17 attach to the front and back of the bib section as shown in FIG. 2.

Figure 2B:
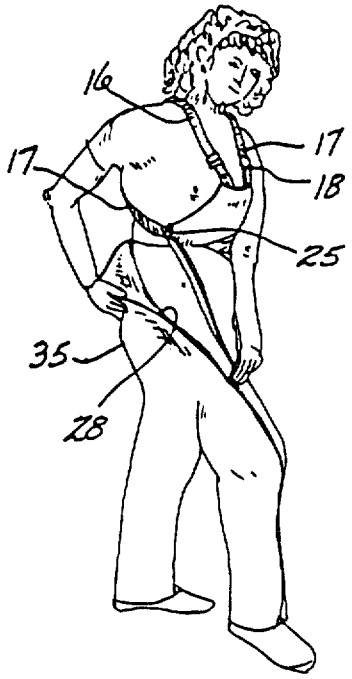
FIG. 2B shows the manner in which the seat section of the female configuration opens without disturbing the shoulder straps.
Figure 2A:
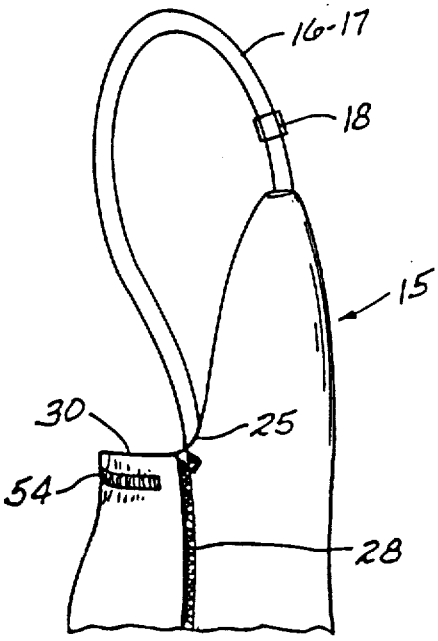
FIG. 2A shows a female configuration.
Figure 1A:
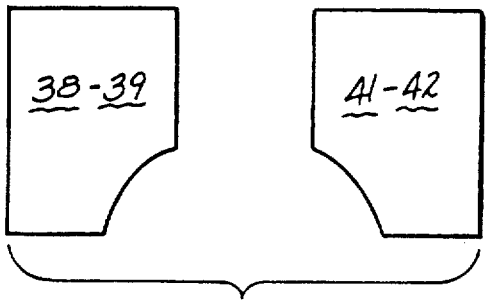
FIG. 1A shows a general layout of the four panels from which the third layer is fabricated.

In contrast, both ends of the straps 16 and 17 in the female configuration attach solely to the front of the bib section as is most apparent in FIGS. 2A and 2B.

The closure means 24, 28 and 29 define conventional zipper units.

Figure 3A:
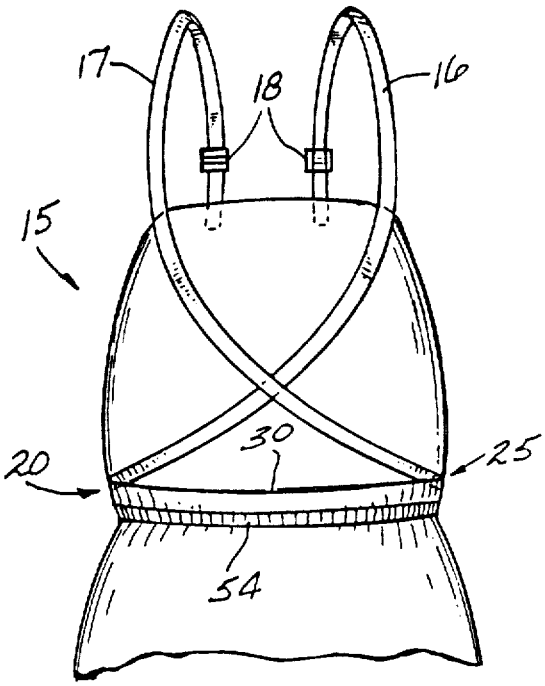
FIG. 3A is a rear view of the female configuration showing details of the first, second and third layers.
Figures 3, 3B:
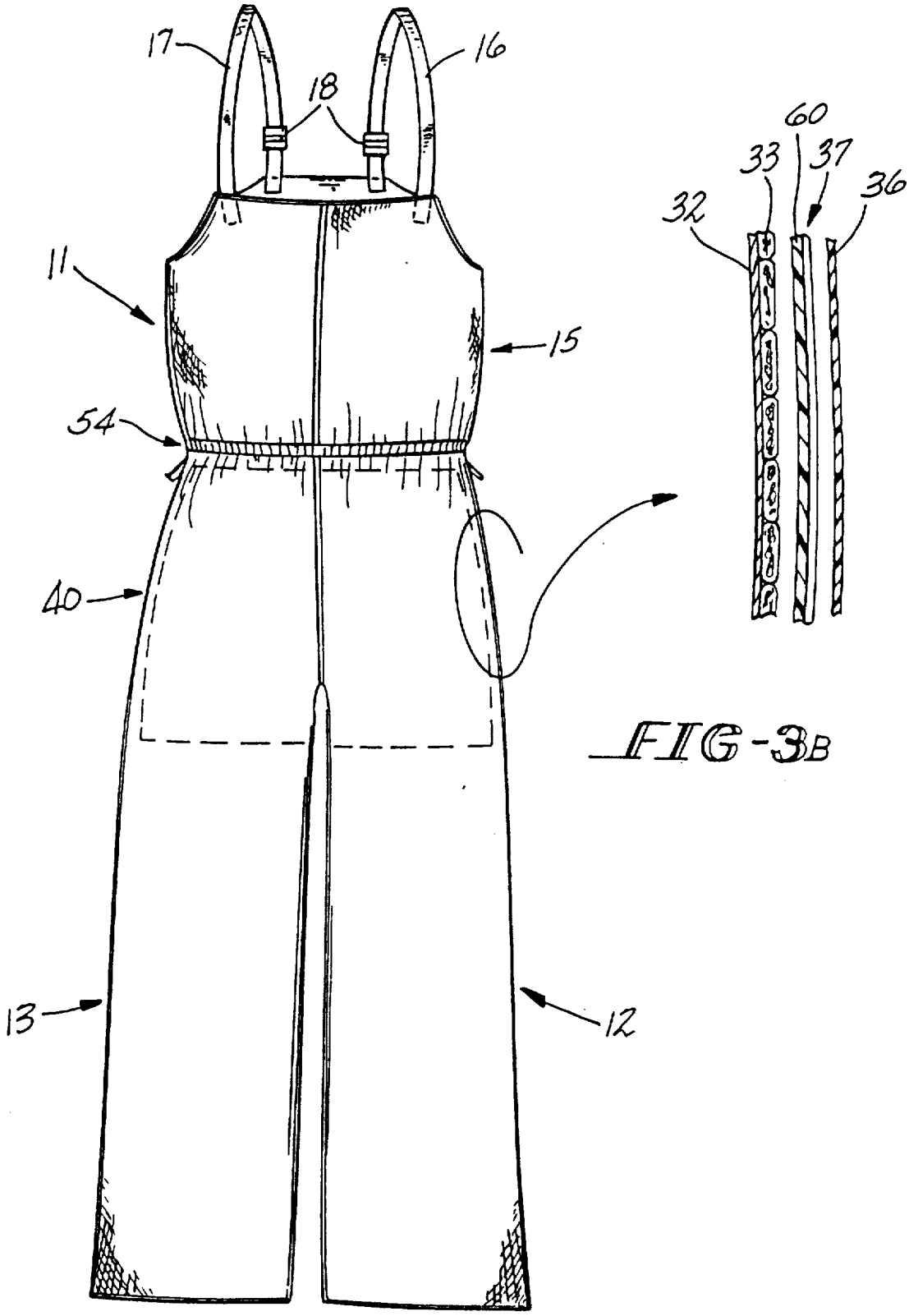
FIG. 3 is a rear elevational view of the garment of FIG. 1 illustrating the male configuration.
Figure 4:
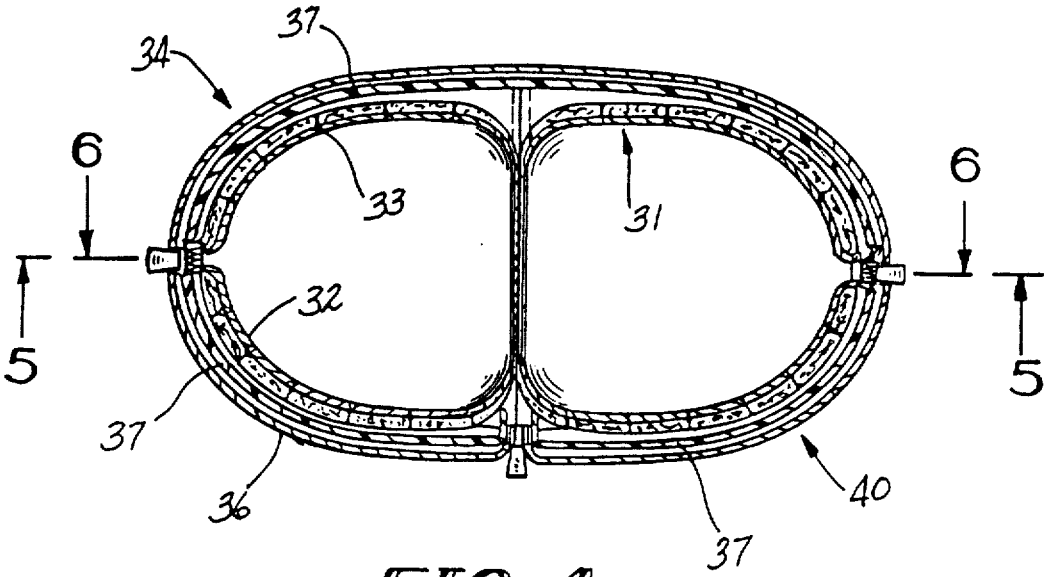
FIG. 4 is a horizontal sectional view in the plane of the line 4—4 of FIG. 1 as viewed in the direction of the arrows.
Figure 5:
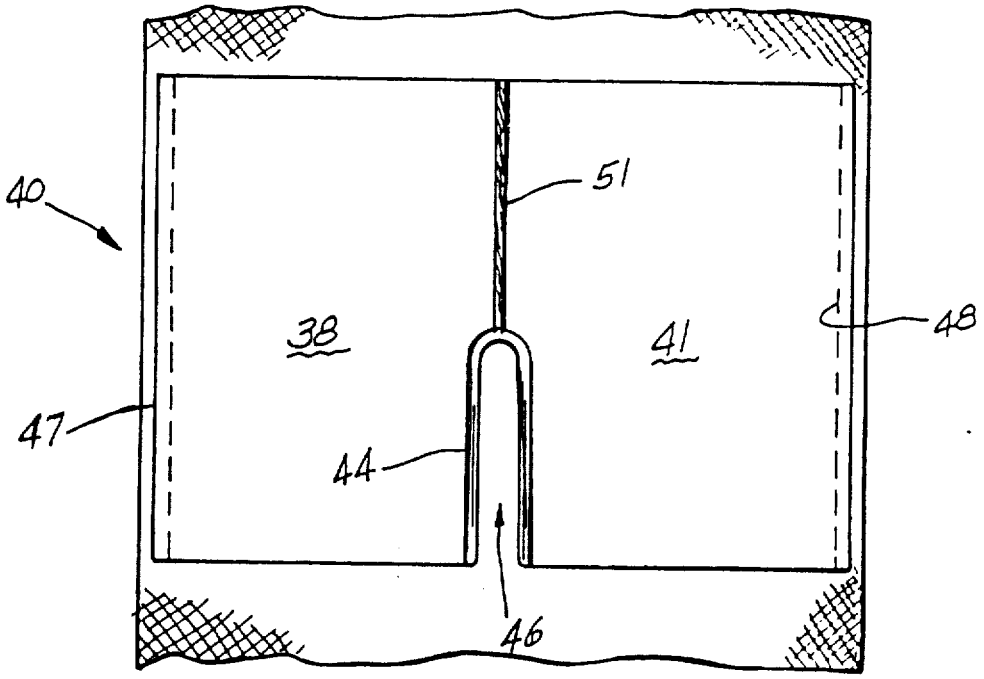
FIG. 5 is a partial vertical section of FIG. 4 in the plane of the line 5—5 as viewed in the direction of the arrows showing the back side of the third layer with the inner layer removed for clarity.

As is most apparent in FIG. 3B the garment includes multiple layers wherein a first layer 31 comprises an inner textile fabric 32 bound compositely such as by stitching to a textile, felted batting 33 fabricated of synthetic, needle punched or felted fibers to create a quilted structure with the fabric 32 disposed next to the wearer.

A second layer 34 comprises an outer waterproof textile fabric 36 of nylon fibers.

The seams of this layer are sewn with double stitching and the needle holes of the stitching are waterproofed by heat sealing a thermoplastic tape over the stitching to seal needle holes.

Sandwiched between the first and second layers 31 and 34 in the region of the upper portion of the leg sections and the lower portion of the torso section is a third layer 37 defining four panels 38, 39, 41 and 42, (see FIGS. 1 and 1A) each fabricated of a waterproof textile fabric of nylon fibers where at least one side of the fabric is coated with a thermoplastic resin 60 such as polyvinyl chloride.

The panels 38, 39 41 and 42 are fastened together by heat sealing critical seams to develop an undergarment 40 having a continuous inseam 44, a crotch portion 46, side seams 47 and 48, front seam 49 and rear seam 51, as is most apparent in FIGS. 4, 5, 6 and 6A. Critical seams, which are heat sealed, free of sewn stitching, are inseam 44 and front and back seams 49 and 51 respectively.

The practice of heat sealing the panels 38, 39, 41 and 42 at the front and back seams and at the inseam prevents seepage of moisture that would otherwise occur if these seams of the undergarment were sewn. That is, water from the exterior of the overall garment would gain entry through needle holes of the back seam, in particular, the front seam and the adjoining inseam.

The side seams of the undergarment panels are sewn to the first or inner layer 31 at the side openings of the overall garment.

Heat sealing is accomplished by taking advantage of the thermoplastic property of the polyvinyl coating on the panels 38, 39, 41 and 42. That is, during the course of fabrication of the third layer 37, mating panels are positioned so that the thermoplastic coatings are in face to face contact. Thereafter a heating means such as a high frequency unit is applied to marginal portions of the mating panels defining the inseam, back seam and front seam to create a water tight seal free of sewn stitches.

Figure 6:
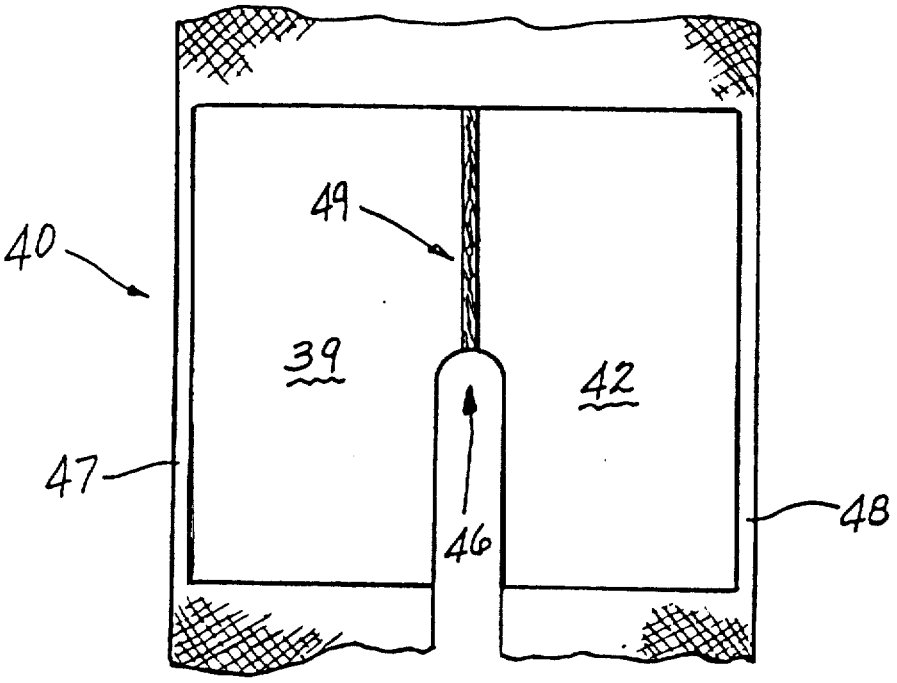
FIG. 6 is a partial vertical section of FIG. 4 in the plane of the line 5—5 as viewed in the direction of the arrows 6—6 showing the front panels of the third layer of a garment designed for use by females.

In the female model of the garment shown in FIG. 6, the front seam 49 extends from the crotch 46 upwardly to the upper edge of the undergarment 40.

Figure 6A:
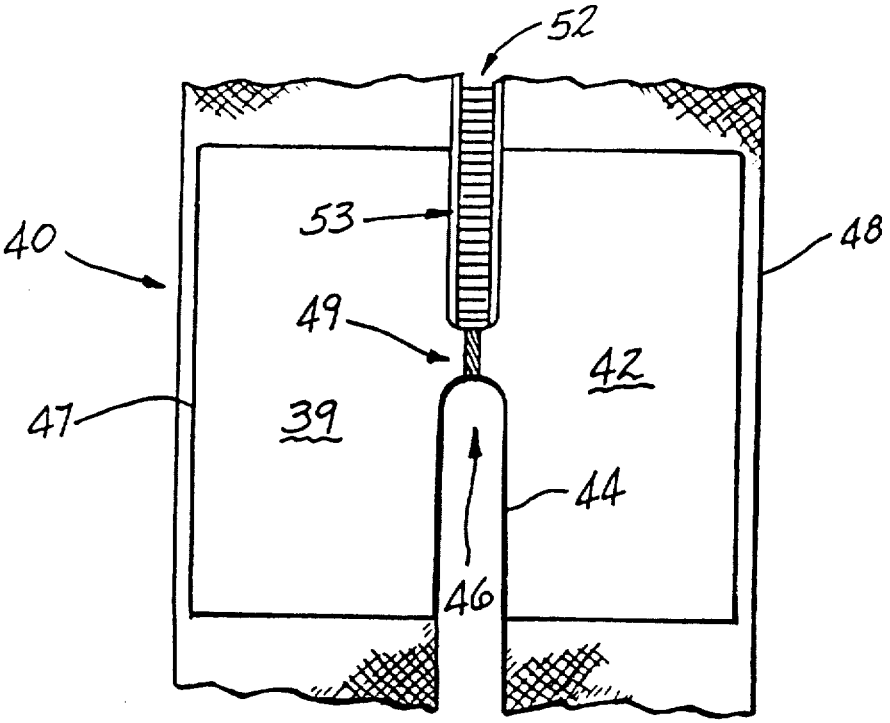
FIG. 6A is a view similar to the illustration of FIG. 6 showing the front panels of the third layer of a garment designed for use by males.

In contrast, and as shown in FIG. 6A, the front seam 49 of the male model extends upwardly for a short span and terminates at a slit 52 having closure means 53 defining a zipper device.

Referring to FIGS. 2A, 2B and 3A, it is apparent that the female configuration of the garment varies further from the male version in that the back of the garment is foreshortened as indicated by the reference numeral 30 and that the shoulder straps 16 and 17 cross in the rear joining the upper rear of the garment at the points indicated by the reference numerals 20 and 25.

This structure facilitates opening (dropping) the seat panel 35 by opening the side closures 28, as indicated in FIG. 2B, without disturbing (detaching) the shoulder straps. This is a feature which females find very convenient.

The region of the back side of the torso just above the undergarment 40 includes an elastic means 54 spanning the rear of the torso section terminating adjacent side openings 28.

Bottom portions of the leg sections are fitted with internal ankle cuffs 56 and 57 defining a fourth layer fabricated of waterproof textile fabric of nylon fibers.

The cuffs 56 and 57 are attached to the inner textile fabric as indicated by the reference numeral 58 in FIG. 1.

The bottom edge of the cuffs 56 and 57 are fitted with elastic bands 50, interrupted by closure means.

The closure means defines pressure sensitive cooperating strips 45 and 55 which are readily opened and closed manually. This closure means may take the form of zipper devices, hook and loop type closures known as VELCRO closures or snap fittings, as desired. The closure means are positioned along the margin of the cuffs.

As stated previously, if additional protection is desired at the sewn side seams of the undergarment 40 (or at any other sewn seams in the overall garment) the needle holes of such seams are sealed by heat sealing a thermoplastic tape over the stitching.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multi-layer all weather garment which provides protection from the elements comprising:

contiguous leg, torso and bib sections, said leg and torso sections having inner and outer shells defining first and second layers, said first layer comprising an inner textile fabric bound compositely to an insulating, textile batting, said second layer comprising an outer waterproof textile fabric, a third layer of waterproof textile fabric sandwiched between said first and second layers, said third layer further comprising a plurality of thermoplastic coated panels secured together to form an undergarment structure including a continuous inseam joining front and back seams of said undergarment structure, said inseam, said back seam and said front seam being heat sealed by bonding said thermoplastic coating thereby rendering

[said heat sealed seams being free of sewn stitching,-]said seams watertight, the panels of said third layer being disposed and dimensioned relative to said first and second layers to overlay and conform to an upper portion of said leg sections extending continuously to a lower portion of said torso section.

2. The garment of claim 1 including a fourth layer at extremities of said first and second layers defining ankle cuffs.

3. The garment of claim 1 including detachable and adjustable support straps connected to the front and back of the bib section whereby the garment is suspended from the shoulders of a wearer.

4. The garment of claim 1 wherein the back of the bib section is open and the adjustable support straps are connected solely to the front of the bib section whereby the garment is suspended from the shoulders of the wearer and the seat panel can be opened while the support straps remain connected.

5. The garment of claim 4 wherein the support straps cross the open back of the bib section.

6. The garment of claim 5 including a front access slit in the torso and bib sections and side access slit in the leg sections, whereby the garment is donned conveniently.

7. The garment of claim 6 including manually operable means for closing and opening said slits.

8. The garment of claim 2 in which the cuffs are provided with closure means defining cooperating strips for closing and opening said cuffs.

9. The garment of claim 8 wherein resilient means are incorporated in said fourth layer for tensioning a cuff about a wearers ankle when the cuff is in the closed position.

10. The garment of claim 1 in which the batting and the inner textile fabric of said first layer are sewn together in the fashion of a quilt, whereby patterned stitching appears on each side of said first layer.

11. The garment of claim 1 wherein at least one side of each panel is coated with polyvinyl chloride.

12. The garment of claim 11 wherein the inner and outer textile fabrics comprise nylon fibers, the third layer comprises nylon textile fabric coated with polyvinyl chloride, the batting comprises felted synthetic fibers.

13. The garment of claim 12 wherein a resilient belt encircles partially the torso section above the third layer.

14. The garment of claim 1 in which the panels have sewn side seams stitched to the first layer.

15. The garment of claim 14 in which the sewn side seams are heat sealed by an overlay of thermoplastic tape.

16. The garment of claim 1 in which the thermoplastic coating of mating panels are in face-to-face contact at said inseam and said front and back seams.

17. The garment of claim 1 including a first configuration defining a male garment and a second configuration defining a female garment, wherein the front seam of the panels of the female configuration extend to the top of the panels, and the front seam of the panels of the male configuration terminates in a manually operable closure means.

* * * * *